(12) United States Patent
Maddukuri et al.

(10) Patent No.: US 11,445,028 B2
(45) Date of Patent: Sep. 13, 2022

(54) SYSTEM AND METHOD FOR PROVIDING SECURE CONSOLE ACCESS WITH MULTIPLE SMART NICS USING NC-SL AND SPDM

(71) Applicant: DELL PRODUCTS, LP, Round Rock, TX (US)

(72) Inventors: Akkiah Maddukuri, Austin, TX (US); Robert Stevens, Austin, TX (US); Deepaganesh Paulraj, Bangalore (IN); Elie Jreij, Pflugerville, TX (US); Rama Bisa, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 14 days.

(21) Appl. No.: 17/138,424

(22) Filed: Dec. 30, 2020

(65) Prior Publication Data
US 2022/0210229 A1    Jun. 30, 2022

(51) Int. Cl.
| | |
|---|---|
| *G06F 15/16* | (2006.01) |
| *H04L 67/141* | (2022.01) |
| *H04L 67/303* | (2022.01) |
| *G06F 15/78* | (2006.01) |
| *G06F 9/38* | (2018.01) |
| *G06F 9/4401* | (2018.01) |
| *H04L 69/00* | (2022.01) |

(52) U.S. Cl.
CPC .......... *H04L 67/141* (2013.01); *G06F 9/3877* (2013.01); *G06F 9/4406* (2013.01); *G06F 15/7807* (2013.01); *H04L 67/303* (2013.01); *H04L 69/26* (2013.01)

(58) Field of Classification Search
CPC ..... H04L 67/141; H04L 67/303; H04L 69/26; G06F 9/3877; G06F 9/4406; G06F 15/7807
USPC ........................................................ 709/227
See application file for complete search history.

(56) References Cited

U.S. PATENT DOCUMENTS

| | | | | |
|---|---|---|---|---|
| 8,254,261 | B2 * | 8/2012 | Droux | H04L 49/70 709/239 |
| 10,430,351 | B2 * | 10/2019 | Gupta | G06F 13/20 |
| 10,810,085 | B2 * | 10/2020 | Ryan | G06F 11/1441 |
| 10,853,211 | B2 * | 12/2020 | Nelogal | G06F 3/0683 |
| 10,979,497 | B2 * | 4/2021 | Rajagopalan | G06F 11/3058 |
| 10,986,171 | B2 * | 4/2021 | Peng | H04L 41/0823 |
| 11,175,918 | B2 * | 11/2021 | Thomas | H04L 41/0226 |
| 11,194,377 | B2 * | 12/2021 | Rao | G06T 1/20 |
| 2014/0196022 | A1 * | 7/2014 | Skutin | G06F 8/61 717/176 |
| 2019/0004826 | A1 * | 1/2019 | Ryan | H04L 61/3025 |
| 2019/0026022 | A1 * | 1/2019 | Nelogal | G06F 3/0631 |
| 2019/0068509 | A1 | 2/2019 | Hyatt et al. | |
| 2019/0087182 | A1 * | 3/2019 | Thomas | H04L 69/08 |
| 2020/0133538 | A1 * | 4/2020 | Nelogal | G06F 11/2041 |
| 2020/0195469 | A1 | 6/2020 | McLean et al. | |

\* cited by examiner

*Primary Examiner* — Alicia Baturay
(74) *Attorney, Agent, or Firm* — Larson Newman, LLP

(57) ABSTRACT

An information handling system includes a data handling device and a baseboard management controller (BMC). The data handling device includes a co-processor configured to instantiate a device operating system for the data handling device. The data handling device includes a Management Component Transport Protocol (MCTP) endpoint. The BMC establishes a serial terminal session with the device operating system via the MCTP endpoint.

16 Claims, 2 Drawing Sheets

SYSTEM AND METHOD FOR PROVIDING SECURE CONSOLE ACCESS WITH MULTIPLE SMART NICS USING NC-SL AND SPDM

FIELD OF THE DISCLOSURE

This disclosure generally relates to information handling systems, and more particularly relates to providing secure console access with multiple smart network interface cards.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include a data handling device and a baseboard management controller (BMC). The data handling device may include a co-processor configured to instantiate a device operating system for the data handling device. The data handling device may further include a Management Component Transport Protocol (MCTP) endpoint. The BMC may establish a serial terminal session with the device operating system via the MCTP endpoint.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
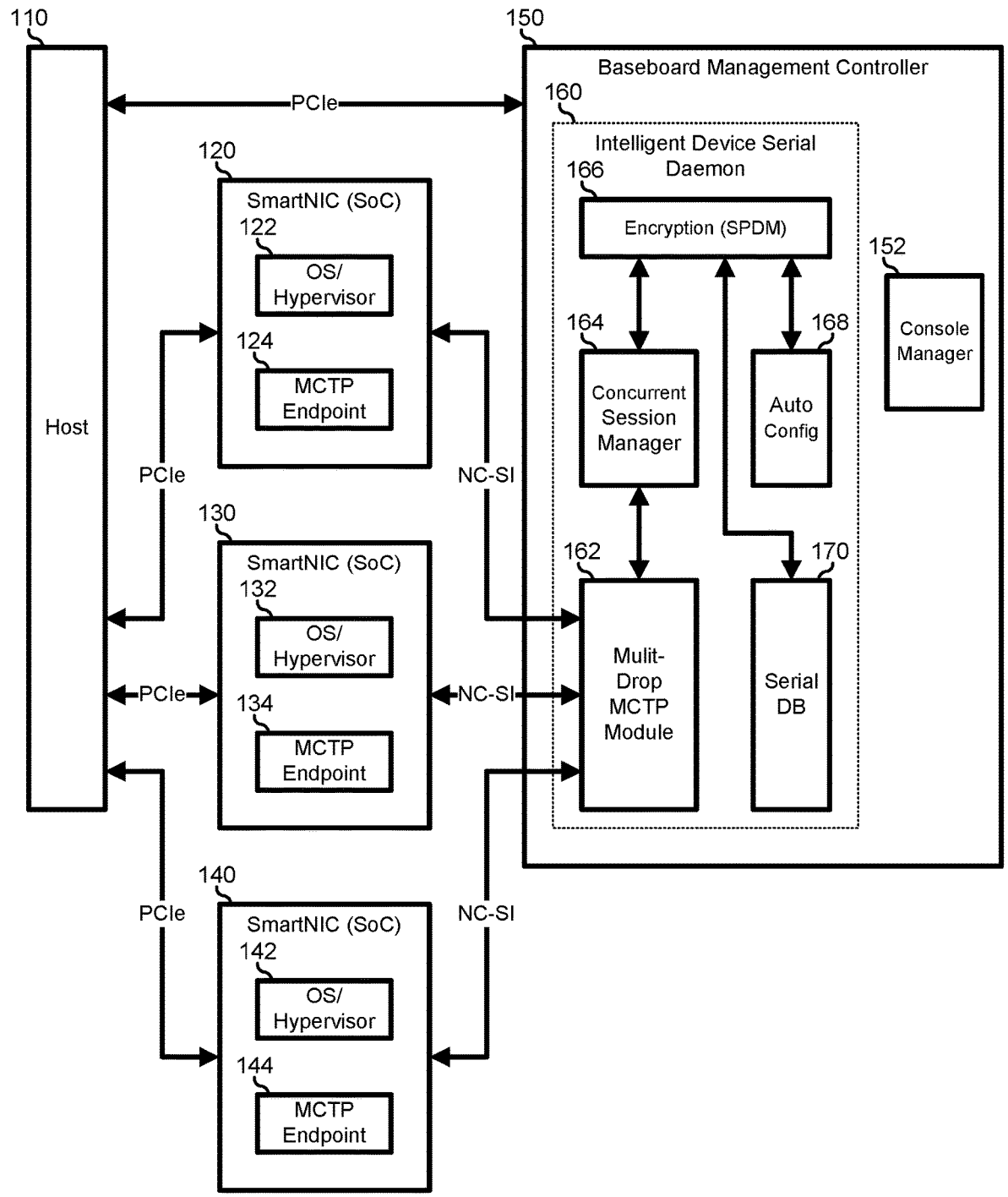
FIG. 1 is a block diagram of an information handling system according to an embodiment of the current disclosure.

FIG. 1 illustrates an information handling system 100, including a host processing system 110, Smart Network Interface Cards (SmartNICs) 120, 130, and 140, and a baseboard management controller 150. Host processing system 110 represents the elements of information handling system 100 that are typically associated with the processing environment of a computer system. Here, host processing system 110 may be understood to include computer hardware, such as one or more processor, volatile and non-volatile memory devices, input/output (I/O) devices, storage devices, human interface devices and the like, as needed or desired. Host processing system 110 may further be understood to include machine-executable code instantiated on the computer hardware, such as a Basic Input/Output System or Universal Extensible Firmware Interface (BIOS/UEFI), device or service firmware, device or service drivers, an operating system (OS), a virtual machine hypervisor, application software, utility or service software, daemons, or the like, as needed or desired. As such, host processing system 110 may be understood to represent the elements of information handling system 100 that are configured to perform the processing tasks associated with a particular type of computer system, such as a server, a blade server system, a storage server, an I/O server, a network server, router, or switch, a workstation or PC type computer, or the like. In a particular case, information handling system 110 may represent an information handling system that is characterized as utilizing a large capacity network interface, a high availability network interface, or a combination thereof, as may be understood by the presence of three (3) SmartNICs.

SmartNICs 120, 130, and 140 represent network interface cards (NICs) that operate to offload processing tasks that might normally be handled by a processor of host processing system 110. In particular, SmartNICs 120 may be characterized as including a processing capacity in its own right, that may be preprogrammed to provide various offload engines to perform the processing tasks. Here, SmartNICs 120, 130, and 140 may perform complex processing tasks such as Open Virtual Switch (OVS) control plane processing, analytics, container acceleration, cloud virtualization, data encryption/decryption, fault isolation, stateful packet filtering, storage hashing, error correction, data compression, and the like, as needed or desired. In terms of hardware, the processing capabilities of SmartNICs 120, 130, and 140 may be provided by one or more of a System-On-A-Chip (SoC), an Application Specific Integrated Circuit (ASIC), a Field Programmable Gate Array (FPGA), a general purpose Graphics Processing Unit (GPU), or the like, as needed or desired. Here, SmartNICs 120, 130, and 140 are illustrated as being based upon SoCs, but this is not necessarily so, and the teachings of the current invention may be readily applied to other types of processing devices associated with SmartNICs, as may be known to the skilled artisan. Moreover, the use of SmartNICs 120, 130, and 140, as illustrated herein, should not be understood to be limiting, and the teachings of the current invention may be readily applied to other types of add-in devices as may be known to the skilled artisan, such as storage controllers, graphics controllers, co-processors, data processing off-load engines, FPGAs, GPUs, ASICs, and the like, as needed or desired.

SmartNIC 120 includes an OS/hypervisor 122, and a Management Component Transport Protocol (MCTP) endpoint 124. OS/hypervisor 122 represents an OS that is confined to the operation of SmartNIC 120, and is distinct from any OS that may be operating on host processing system 110. As various activities of a SmartNIC may involve various virtualizations, OS/hypervisor 122 may also represent an OS that incorporates a virtual machine hypervisor or a module that instantiates a hypervisor on the OS, as needed or desired. MCTP endpoint 124 represents a function instantiated on OS/hypervisor 122 that provides a terminus for MCTP functionality on SmartNIC 120, and operates to handle MCTP Control commands to monitor, manage, and maintain the functionality of the SmartNIC. Note here that the MCTP uses a logical address called the endpoint ID (EID) for addressing and routing MCTP packets to and from endpoints, as will be described further below. SmartNICs 130 and 140 include respective OS/hypervisors 132 and 142, similar to OS hypervisor 122, and respective MCTP endpoints 134 and 144, similar to MCTP endpoint 124.

BMC 150 represents one or more processing devices, such as a dedicated BMC SoC device, one or more associated memory devices, one or more network interface devices, a complex programmable logic device (CPLD), and the like, as needed or desired. BMC 150 operates to provide a management environment for information handling system 100. In particular, BMC 150 is connected to various components of the host environment via various internal communication interfaces, such as a Low Pin Count (LPC) interface, an Inter-Integrated-Circuit (I2C) interface, a PCIe interface, a Network Controller Sideband Interface (NC-SI), or the like, to provide an out-of-band (OOB) mechanism to retrieve information related to the operation of host processing system 110, to provide BIOS/UEFI or system firmware updates, to manage non-processing components of information handling system 100, such as system cooling fans and power supplies. BMC 150 can include a network connection to an external management system, and the management device can communicate with the management system to report status information for information handling system 100, to receive BIOS/UEFI or system firmware updates, or to perform other task for managing and controlling the operation of the information handling system. An example of BMC 150 may include a commercially available BMC product or other device that operates in accordance with an Intelligent Platform Management Interface (IPMI) specification, a Web Services Management (WSMan) interface, a Redfish Application Programming Interface (API), another Distributed Management Task Force (DMTF) interface, or other management standard, and can include an Integrated Dell Remote Access Controller (iDRAC), an Embedded Controller (EC), or the like. BMC 150 may further include associated memory devices, logic devices, security devices, or the like, as needed or desired. BMC 150 includes a console manager 152 and an Intelligent Device Serial Daemon 160, as described further below.

It has been understood by the inventors of the current disclosure that many types of SmartNICs, storage controllers, graphics controllers, co-processors, data processing off-load engines and the like, referred to here as smart devices, instantiate a native OS or hypervisor, such as a Linux OS or the like. Here, the operation of the native OS or hypervisor of smart devices may be relatively opaque to a host processing system or BMC of the information handling system into which the smart devices are installed. In particular, the host processing system and BMC are generally blind to the initial boot process within the smart devices, the operating state of the native OS or hypervisor of the smart devices, the register or configuration states within the smart devices, the error logging and handling mechanisms on the smart devices, the crash handling and diagnostic mechanisms of the smart devices, the command line interfaces to the OS/hypervisors, or other internal operational information for the smart devices. This situation may be somewhat mitigated by the presence of serial communication interfaces between the host processing system and the various smart devices. For example, a typical smart device may be in a limited communication with the host processing system via a serial communication interface that may be suitable for the setting of operating options of the smart devices, or for receiving abbreviated status information from the smart devices. Such serial communication interfaces may include an Improved Inter-Integrated Circuit (I3C) interface, a Low Pin Count (LPC) interface, a Universal Serial Bus (USB) interface, a Serial Presence Interface (SPI), or the like. However, here, even if the host processing system retains some ability to communicate with smart devices over the various serial interfaces, the ability to access such functionality is more commonly associated with the operation of the management environment of the BMC, because processing resources of the host processing system are better utilized performing the processing tasks to which the information handling system is targeted, rather than utilizing those resources for management functions. Further, in order for a BMC to access the management information from the host processing system necessitates the intermediation of management agents operating on the host processing system, consuming further processing resources of the host processing system. Further still, the manufacturers of smart devices have typically been unwilling to provide separate serial communication interface for the use of the BMC, either for cost and performance reasons, or due to the architectural complexity of such added interfaces. Moreover, even where serial interfaces are provided, such as where a smart device includes a Universal Asynchronous Receiver Transmitter (UART) accessible via a RS232 cable, the number and types of smart devices on a typical information handling system is increasing, and the necessity of communicating with each smart device results in complex cabling and serial interface multiplexing schemes to connect a single serial interface of the BMC with the multiple smart devices. However, even here, if more than one smart device needs to be accessed for monitoring, managing, and maintaining the smart devices, multiple independent sessions need to be established, increasing both the processing load on the BMC and the complexity of the operating environment of the BMC. Finally, the operations of the serial interface are not secured, risking the exposure of the system root passwords and other protected information of the smart devices.

Intelligent device serial daemon 160, hereinafter "daemon 160," includes a multi-drop MCTP module 162, a concurrent session manager 164, an encryption/Security Protocol and Data Model (SPDM) module 166, an automatic configuration module 168, and a persistent serial database 170. Daemon 160 operates to establish serial data communications with SmartNICs 120, 130, and 140. In particular, MCTP endpoints 124, 134, and 144 operate to encapsulate the serial data that would normally be communicated via their associated UARTs into MCTP message format, as needed to communicate with daemon 160. It will be understood that serial communication may not always imply that the data is communicated via a serial data communication link, but rather is intended to focus on the type of data communicated, such as data associated with historical serial communication ports, such as a COMM port or other physical port, as well as an emulated port, such as may be created by a Bluetooth or USB port adapter. Here, MCTP module 162 detects MCTP endpoints 124, 134, and 144, and sends a vendor defined command (MCTP Type 7) to determine the extended capabilities of SmartNICs 120, 130, and 140. Here SmartNICs 120, 130, and 140 are configured to respond to the vendor defined command, indicating that the SmartNICs are compatible and configured to establish serial data communication with daemon 160. For example, a particular flag in a register, such as a Compatibility bit, may be set. If SmartNICs 120, 130, and 140 are compatible, then MCTP module 162 establishes sessions with each of the SmartNICs. In a particular embodiment, the sessions are provided as secure sessions by SPDM module 166, and the communications are established as SPDM sessions (MCTP Type 5). Once sessions are established between SmartNICs 120, 130, and 140 and MCTP module 162, the SmartNICs can provide serial console data to daemon 160 as NC-SI passthrough messages (MCTP Type 3), or the daemon can request the serial console data from the SmartNICs, for example by issuing a vendor defined Get Serial Data command, as shown in Table 1, below. A vendor defined Get Serial Data response is shown in Table 1, below. In the embodiment where the sessions are established as SPDM sessions, SmartNICs 120, 130, and 140 and daemon 160 operate to encrypt the data communicated utilizing an encapsulated format message type (MCTP Type 6).

TABLE 1

Vendor Defined Get Serial Data Command

| | | | | |
|---|---|---|---|---|
| 00-15 | | NC-SI Header | | |
| 16-19 | | Vendor's Manufacturer ID | | |
| 20-23 | Payload Version | Vendor Command ID | GET_SERIAL_DATA | Reserved |
| 24-27 | | Checksum | | |

TABLE 2

Vendor Defined Get Serial Data Reply

| | | | | |
|---|---|---|---|---|
| 00-15 | | NC-SI Header | | |
| 16-19 | Response Code | | Reason Code | |
| 20-23 | | Vendor's Manufacturer ID | | |
| 24-27 | Payload Version | Vendor Command ID | GET_SERIAL_DATA | Serial Data Size |
| . . . | | Serial Data | | |
| . . . | | Checksum | | |

Console manager 152 represents various interfaces that provide for access to BMC 150 from host processing system 110 or a management system connected to the BMC. In particular, console manager 152 provides various standards-based and proprietary interfaces that permit access to the functions and features of daemon 160, as described herein. In this way, a data center administrator or other technician can send user human interface device (HID) inputs, such as keyboard or mouse inputs, to SmartNICs 120, 130, and 140 to monitor, manage, or maintain the SmartNICs, as needed or desired. Here, daemon 160 operates to parse a serial console data buffer of console manager 152, and to push the serial console data to SmartNICs 120, 130, and 140. An example of an access interface may include a Redfish standard application programming interface (API), an Intelligent Platform Management Interface (IPMI) or other Distributed Management Task Force (DMTF) interface such as a Web Services Management (WSMan) interface, a Remote Access Controller Administrator (RACADM) interface, another management standard interface, a vendor defined interface, or the like, as needed or desired.

In a particular embodiment, daemon 160 provides a multi-drop mode whereby an input from console manager 152 is delivered to two or more of SmartNICs 120, 130, and 140 simultaneously, thereby creating a virtual bus architecture between the SmartNICs and BMC 150. Here, in a first case, MCTP module 162 establishes a session with a first one of the selected SmartNICs (e.g., SmartNIC 120), and then session manager 164 directs MCTP module 162 to establish a session with any additional SmartNICs (e.g., SmartNIC 140) with a common session ID of the established session. In another case, MCTP module 162 can already have established sessions with each of SmartNICs 120, 130, and 140. Here, session manager 164 operates to create a virtual session that includes the established session with the selected SmartNICs (e.g., SmartNICs 120 and 140). Then, in either case, when console manager 152 provides data associated with the common session, MCTP module 162 provides the data to each SmartNIC in the common session (e.g., to SmartNICs 120 and 140) simultaneously. In particular, MCTP module 162 frames the data into an NC-SI serial data command and issues the NC-SI serial data command to each of the selected SmartNICs. Each of the selected SmartNICs will then respond with an NC-SI serial data reply. An NC-SI serial data reply can include an indication that the NC-SI serial data command was successfully received and executed, or an indication that the NC-SI serial data command failed, for example by returning a non-zero reason code or a non-zero response code. When a NC-SI serial data command fails in one or more of the selected SmartNICs, daemon 160 operates to retry the command to the particular failing SmartNIC, and, if the failure is repeated, to perform failure recovery procedures.

In another embodiment, daemon 160 operates to provide persistent serial database 170 that operates to collect serial data and user keyboard inputs from console manager 152. In this way, the serial data and user keyboard inputs can be stored for future reference, for example for automatic configuration of SmartNICs 120, 130, and 140 using the previously recorded actions. In a particular case, the serial data and user key inputs are stored in an associative vector format such that the serial data and user key inputs can be associated with each particular one of SmartNICs 120, 130, and 140. Here, for example, where a particular set of serial data is targeted to a particular SmartNIC, daemon 160 can check the serial data against persistent serial database 170 to determine if, at a previous time, a same string of serial data was provided in the multi-drop mode to two or more of the SmartNICs. If so, daemon 160 can automatically ascribe the serial data string to each of the SmartNICs in the associated group session. In another case, daemon 160 operates to poll SmartNICs 120, 130, and 140 to monitor the boot progress of each SmartNIC. Then, if one or more of SmartNICs 120, 130, or 140 has halted abnormally, daemon 160 determines that the associated SmartNICs have crashed, and operates to retrieve a previously stored crash handler serial data pattern from persistent serial database 170 to address the crash.

It will be understood that, under the Management Component Transport Protocol (MCTP), other types of data transport can be encapsulated, including MCTP control data (MCTP Type 0), Platform Level Data Model (PLDM) data (MCTP Type 1), NC-SI control data (MCTP Type 2), NC-SI passthrough data (MCTP Type 3), Non-Volatile Memory Express Management Interface (NVMe-MI) data (MCTP Type 4, Security Protocol and Data Model (SPDM) data (MCTP Type 5), secure message data (MCTP Type 6), or vendor defined data (MCTP Type 7). In this regard, it will be further understood that the teachings of the current disclosure, as described above, may be readily adapted by the skilled artisan to other types of intelligent devices, such as storage controllers, graphics controllers, co-processors, data processing off-load engines, FPGAs, GPUs, ASICs, and the like, as needed or desired.

Figure 2:
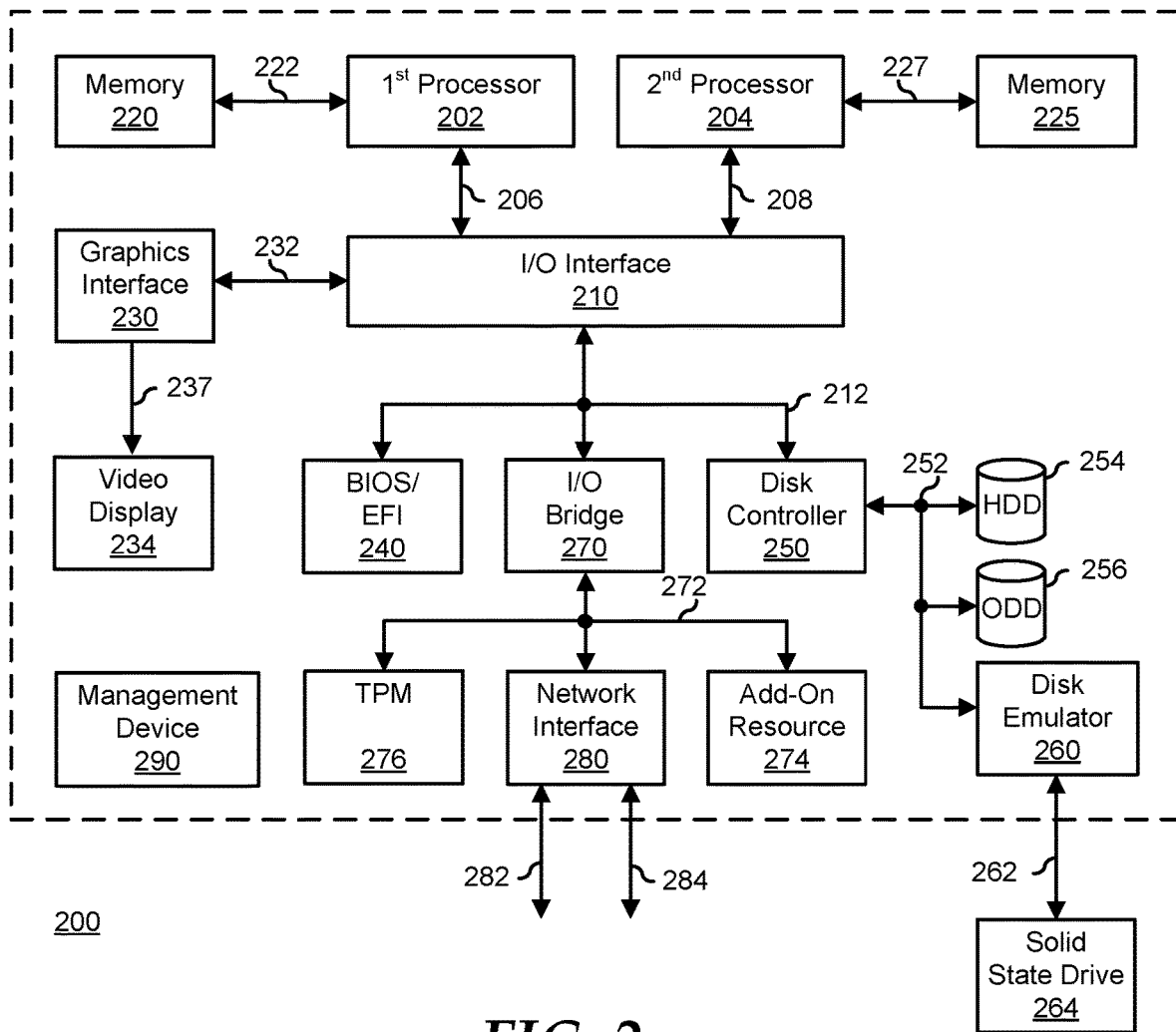
FIG. 2 is a block diagram illustrating a generalized information handling system according to another embodiment of the present disclosure.

FIG. 2 illustrates a generalized embodiment of an information handling system 200. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 200 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 200 can include processing resources for executing machine-executable code, such as a central processing unit (CPU), a programmable logic array (PLA), an embedded device such as a System-on-a-Chip (SoC), or other control logic hardware. Information handling system 200 can also include one or more computer-readable medium for storing machine-executable code, such as software or data. Additional components of information handling system 200 can include one or more storage devices that can store machine-executable code, one or more communications ports for communicating with external devices, and various input and output (I/O) devices, such as a keyboard, a mouse, and a video display. Information handling system 200 can also include one or more buses operable to transmit information between the various hardware components.

Information handling system 200 can include devices or modules that embody one or more of the devices or modules described below, and operates to perform one or more of the methods described below. Information handling system 200 includes a processors 202 and 204, an input/output (I/O) interface 210, memories 220 and 225, a graphics interface 230, a basic input and output system/universal extensible firmware interface (BIOS/UEFI) module 240, a disk controller 250, a hard disk drive (HDD) 254, an optical disk drive (ODD) 256 , a disk emulator 260 connected to an external solid state drive (SSD) 262, an I/O bridge 270, one or more add-on resources 274, a trusted platform module (TPM) 276, a network interface 280, a management device 290, and a power supply 295. Processors 202 and 204, I/O interface 210, memory 220, graphics interface 230, BIOS/UEFI module 240, disk controller 250, HDD 254, ODD 256 , disk emulator 260, SSD 262, I/O bridge 270, add-on resources 274, TPM 276, and network interface 280 operate together to provide a host environment of information handling system 200 that operates to provide the data processing functionality of the information handling system. The host environment operates to execute machine-executable code, including platform BIOS/UEFI code, device firmware, operating system code, applications, programs, and the like, to perform the data processing tasks associated with information handling system 200.

In the host environment, processor 202 is connected to I/O interface 210 via processor interface 206, and processor 204 is connected to the I/O interface via processor interface 208. Memory 220 is connected to processor 202 via a memory interface 222. Memory 225 is connected to processor 204 via a memory interface 227. Graphics interface 230 is connected to I/O interface 210 via a graphics interface 232, and provides a video display output 236 to a video display 234. In a particular embodiment, information handling system 200 includes separate memories that are dedicated to each of processors 202 and 204 via separate memory interfaces. An example of memories 220 and 230 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 240, disk controller 250, and I/O bridge 270 are connected to I/O interface 210 via an I/O channel 212. An example of I/O channel 212 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 210 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 240 includes BIOS/UEFI code operable to detect resources within information handling system 200, to provide drivers for the resources, initialize the resources, and access the resources. BIOS/UEFI module 240 includes code that operates to detect resources within information handling system 200, to provide drivers for the resources, to initialize the resources, and to access the resources.

Disk controller 250 includes a disk interface 252 that connects the disk controller to HDD 254, to ODD 256, and to disk emulator 260. An example of disk interface 252 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 260 permits SSD 264 to be connected to information handling system 200 via an external interface 262. An example of external interface 262 includes a USB interface, an IEEE 1394 (Firewire) interface, a proprietary interface, or a combination thereof Alternatively, solid-state drive 264 can be disposed within information handling system 200.

I/O bridge 270 includes a peripheral interface 272 that connects the I/O bridge to add-on resource 274, to TPM 276, and to network interface 280. Peripheral interface 272 can be the same type of interface as I/O channel 212, or can be a different type of interface. As such, I/O bridge 270 extends the capacity of I/O channel 212 when peripheral interface 272 and the I/O channel are of the same type, and the I/O bridge translates information from a format suitable to the I/O channel to a format suitable to the peripheral channel 272 when they are of a different type. Add-on resource 274 can include a data storage system, an additional graphics interface, a network interface card (NIC), a sound/video processing card, another add-on resource, or a combination thereof. Add-on resource 274 can be on a main circuit board, on separate circuit board or add-in card disposed within information handling system 200, a device that is external to the information handling system, or a combination thereof.

Network interface 280 represents a NIC disposed within information handling system 200, on a main circuit board of the information handling system, integrated onto another component such as I/O interface 210, in another suitable location, or a combination thereof. Network interface device 280 includes network channels 282 and 284 that provide interfaces to devices that are external to information handling system 200. In a particular embodiment, network channels 282 and 284 are of a different type than peripheral channel 272 and network interface 280 translates information from a format suitable to the peripheral channel to a format suitable to external devices. An example of network channels 282 and 284 includes InfiniBand channels, Fibre Channel channels, Gigabit Ethernet channels, proprietary channel architectures, or a combination thereof. Network channels 282 and 284 can be connected to external network resources (not illustrated). The network resource can include another information handling system, a data storage system, another network, a grid management system, another suitable resource, or a combination thereof.

Management device 290 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 200. In particular, management device 290 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 200, such as system cooling fans and power supplies. Management device 290 can include a network connection to an external management system, and the management device can communicate with the management system to report status information for information handling system 200, to receive BIOS/UEFI or system firmware updates, or to perform other task for managing and controlling the operation of information handling system 200. Management device 290 can operate off of a separate power plane from the components of the host environment so that the management device receives power to manage information handling system 200 when the information handling system is otherwise shut down. An example of management device 290 include a commercially available BMC product or other device that operates in accordance with an Intelligent Platform Management Interface (IPMI) specification, a Web Services Management (WSMan) interface, a Redfish Application Programming Interface (API), another Distributed Management Task Force (DMTF) interface, or other management standard, and can include an Integrated Dell Remote Access Controller (iDRAC), an Embedded Controller (EC), or the like. Management device 290 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
a first data handling device including a first co-processor configured to instantiate a first device operating system for the first data handling device, and further including a first Management Component Transport Protocol (MCTP) endpoint; and
a baseboard management controller (BMC) configured to establish a first serial terminal session with the first device operating system via the first MCTP endpoint;
wherein the first serial terminal session is established utilizing a network controller sideband interface pass-through type MCTP command; and
wherein after establishing the first serial terminal session, the first serial terminal session is further maintained utilizing an encapsulated format type MCTP command.

2. The information handling system of claim 1, wherein the first data handling device comprises a System-on-a-Chip (SoC) based network interface card (NIC).

3. The information handling system of claim 1, wherein after establishing the first serial terminal session, the first serial terminal session is further maintained utilizing a Security Protocol and Data Model (SPDM) type MCTP command (MCTP Type 5).

4. The information handling system of claim 1, further comprising:
a second data handling device coupled to a host processing system, the second data handling device including a second co-processor configured to instantiate a second device operating system for the second data handling device and further including a second MCTP endpoint;
wherein the BMC is further configured to establish a second serial terminal session with the second device operating system via the second MCTP endpoint, to establish a virtual serial terminal session with the first device operating system via the first MCTP endpoint and with the second device operating system via the second MCTP endpoint.

5. The information handling system of claim 4, wherein the BMC includes a persistent serial database configured to store a keyboard input string.

6. The information handling system of claim 5, wherein the BMC is further configured to provide the keyboard input string to the first data handling device and to the second data handling device via the virtual serial terminal session.

7. The information handling system of claim 1, wherein the BMC is further configured to configure the first device operating system via the first serial terminal session.

8. The information handling system of claim 1, wherein the first data handling device comprises at least one of a storage controller, a graphics controller, a co-processor, a data processing off-load engine, a field programmable gate array, a graphics processing unit, and an application specific integrated circuit.

9. A method, comprising:
  instantiating, by a processor of an information handling system, a host operating system for the information handling system;
  instantiating, by a first co-processor of a first data handling device of the information handling system, a first device operating system for the first data handling device, wherein the first data handling system includes a first management component transport protocol (MCTP) endpoint; and
  establishing, by a baseboard management controller (BMC) of the information handling system, a first serial terminal session with the first device operating system via the first MCTP endpoint;
  establishing, by the BMC, the first serial terminal session utilizing a network controller sideband interface pass-through type MCTP command; and
  after establishing the first serial terminal session, further maintaining the first serial terminal session utilizing a Security Protocol and Data Model type MCTP command.

10. The method of claim 9, wherein the first data handling device comprises a System-on-a-Chip (SoC) based network interface card (NIC).

11. The method of claim 9, further comprising after establishing the first serial terminal session, further maintaining the first serial terminal session utilizing the Security Protocol and Data Model (SPDM) type MCTP command.

12. The method of claim 9, further comprising:
  instantiating, by a second co-processor of a second data handling device of the information handling system, a second device operating system for the second data handling device, wherein the second data handling device includes a second MCTP endpoint; and
  establishing, by the BMC, a second serial terminal session with the second device operating system via the second MCTP endpoint.

13. The method of claim 12, further comprising storing a keyboard input string in a persistent serial database of the BMC.

14. The method of claim 13, further comprising providing the keyboard input string to the first data handling device and to the second data handling device via the virtual serial terminal session.

15. The method of claim 9, further comprising configuring the first device operating system via the first serial terminal session.

16. An information handling system, comprising:
  a host processing system including a processor configured to instantiate a host operating system for the information handling system;
  a first data handling device coupled to the host processing system, the first data handling device including a first co-processor configured to instantiate a first device operating system for the first data handling device and further including a first management component transport protocol (MCTP) endpoint; and
  a baseboard management controller configured to establish a first serial terminal session with the first device operating system via the first MCTP endpoint;
  wherein the first serial terminal session is established utilizing a network controller sideband interface pass-through type MCTP command; and
  wherein after establishing the first serial terminal session, the first serial terminal session is further maintained utilizing an encapsulated format type MCTP command.

* * * * *